(12) United States Patent
Wang (10) Patent No.: US 12,269,101 B1
(45) Date of Patent: Apr. 8, 2025

(54) TWIST DRILL

(71) Applicant: Hongjia Wang, Shanghai (CN)

(72) Inventor: Hongjia Wang, Shanghai (CN)

( * ) Notice: Subject to any disclaimer, the term of this patent is extended or adjusted under 35 U.S.C. 154(b) by 0 days.

(21) Appl. No.: 18/391,429

(22) Filed: Dec. 20, 2023

Related U.S. Application Data (63) Continuation of application No. 18/095,119, filed on Jan. 10, 2023, now Pat. No. 11,865,627, which is a continuation of application No. 17/321,373, filed on May 14, 2021, now Pat. No. 11,554,424, which is a continuation of application No. 17/094,786, filed on Nov. 10, 2020, now Pat. No. 11,007,584, which is a continuation of application No. 16/699,089, filed on Nov. 28, 2019, now Pat. No. 11,007,583, which is a continuation-in-part of application No. 15/847,900, filed on Dec. 19, 2017, now abandoned, which is a continuation-in-part of application No. PCT/CN2016/073767, filed on Feb. 14, 2016.

(51) Int. Cl.
*B23B 51/02* (2006.01)
*B23B 51/00* (2006.01)

(52) U.S. Cl.
CPC ............ *B23B 51/02* (2013.01); *B23B 51/009* (2013.01); *B23B 2251/24* (2013.01)

(58) Field of Classification Search
CPC ....... B23B 51/009; B23B 51/00; B23B 51/05; B23B 2251/046; B23B 2251/282; B23B 2251/406; B23B 2251/108; B23B 2251/70; B23B 2251/40; B23B 2251/52; Y10T 408/906
See application file for complete search history.

(56) References Cited

U.S. PATENT DOCUMENTS

| 38,119 A | 4/1863 | Morse |
| 248,854 A | 11/1881 | Gladwin |
| 716,557 A | 12/1902 | Klingensmith |
| 1,557,900 A | 10/1925 | Thompson |
| 2,193,186 A | 3/1940 | Bannister |
| 2,276,532 A | 5/1940 | Welty |
| 2,786,373 A | 12/1953 | Patton |

(Continued)

FOREIGN PATENT DOCUMENTS

| CN | 1375373 | 10/2002 |
| CN | 2623387 | 7/2004 |

(Continued)

OTHER PUBLICATIONS

Aerospace Industries Association of America, Inc., "National Aerospace Standard, 'NAS 907'", 2001, 27 pages.

(Continued)

*Primary Examiner* — Nicole N Ramos
(74) *Attorney, Agent, or Firm* — Ervin Cohen & Jessup LLP; Kelly W. Cunningham, Esq.

(57) ABSTRACT

The present invention provides a twist drill. A cone portion is provided at a front end of the operating portion, and an exterior surface of the operating portion is provided with a spiral flute for shunting cutting chips. The exterior surface of the cone portion is provided with a plurality of composite cutting blade groups which are sequentially enlarged in diameter from the front end to the rear end of the cone portion. The cone portion is provided with a top blade on the tip. In use, the top blade is used for positioning, and the cutting process is carried out by the top blade and the composite cutting blade groups.

26 Claims, 7 Drawing Sheets

(56) References Cited

U.S. PATENT DOCUMENTS

| | | | |
|---|---|---|---|
| 3,592,555 | A | 7/1971 | Mackey |
| 3,758,222 | A | 9/1973 | Oakes |
| 4,189,266 | A | 2/1980 | Koslow |
| 4,536,107 | A | 8/1985 | Sandy et al. |
| 4,582,458 | A | 4/1986 | Korb et al. |
| 5,442,979 | A | 8/1995 | Hsu |
| 5,452,971 | A | 9/1995 | Nevills |
| 5,466,100 | A | 11/1995 | Ahluwalia |
| 5,503,237 | A | 4/1996 | Neukirchen |
| 5,636,948 | A | 6/1997 | Rexius |
| 5,807,039 | A | 9/1998 | Booher et al. |
| 6,213,692 | B1 | 4/2001 | Guehring et al. |
| 6,428,250 | B2 | 8/2002 | Giebmanns |
| 6,890,133 | B2 | 5/2005 | Singh et al. |
| D544,892 | S | 6/2007 | Watson et al. |
| 7,357,606 | B1 | 4/2008 | Pettit et al. |
| 8,029,215 | B2 | 10/2011 | Gentry et al. |
| 8,215,206 | B2 | 7/2012 | Kozak et al. |
| 8,485,066 | B2 | 7/2013 | Kozak et al. |
| 8,784,017 | B2 | 7/2014 | Ibarra et al. |
| 9,475,128 | B2 | 10/2016 | Sawabe et al. |
| 9,500,038 | B2 | 11/2016 | Neitzell et al. |
| 9,539,653 | B2 | 1/2017 | Rogalla et al. |
| 9,687,915 | B2 | 6/2017 | Durfee |
| 9,731,358 | B2 | 8/2017 | Allen et al. |
| 10,010,332 | B2 | 7/2018 | Atabey |
| 10,058,929 | B2 | 8/2018 | Durfee |
| D840,449 | S | 2/2019 | Wang et al. |
| 10,328,499 | B2 | 6/2019 | Durfee |
| D881,957 | S | 4/2020 | Wang |
| D892,183 | S | 8/2020 | Parendo et al. |
| 10,751,810 | B2 | 8/2020 | Wang et al. |
| D894,978 | S | 9/2020 | Misumi et al. |
| 2001/0010784 | A1 | 8/2001 | Giebmanns |
| 2005/0053438 | A1 | 3/2005 | Wetzl et al. |
| 2007/0020057 | A1 | 1/2007 | Chen |
| 2011/0116884 | A1 | 5/2011 | Li |
| 2012/0195704 | A1 | 8/2012 | White |
| 2012/0201619 | A1 | 8/2012 | Olsson |
| 2012/0301239 | A1 | 11/2012 | Prom et al. |
| 2014/0023445 | A1 | 1/2014 | Allen |
| 2014/0212234 | A1 | 7/2014 | Sawabe et al. |
| 2014/0363244 | A1 | 12/2014 | Durfee |
| 2014/0369776 | A1 | 12/2014 | Durfee |
| 2017/0129022 | A1 | 5/2017 | Durfee |
| 2017/0216979 | A1 | 8/2017 | Prom et al. |
| 2018/0133803 | A1 | 5/2018 | Karuppoor |
| 2018/0133808 | A1 | 5/2018 | Wang |
| 2020/0094331 | A1 | 3/2020 | Wang |
| 2020/0222994 | A1 | 7/2020 | Allen et al. |
| 2021/0060662 | A1 | 3/2021 | Wang |

FOREIGN PATENT DOCUMENTS

| | | |
|---|---|---|
| CN | 101977713 | 2/2011 |
| CN | 102126039 | 7/2011 |
| CN | 202180238 | 4/2012 |
| CN | 103084629 | 5/2013 |
| CN | 203356678 | 12/2013 |
| CN | 104227088 | 12/2014 |
| CN | 204953985 | 1/2016 |
| CN | 205551557 | 9/2016 |
| CN | 207655965 | 7/2018 |
| CN | 110802259 | 2/2020 |
| CN | 211464929 | 9/2020 |
| CN | 112828351 | 5/2021 |
| CN | 214602093 | 11/2021 |
| DE | 19526686 | 3/1996 |
| DE | 29904042 | 9/1999 |
| DE | 20303656 | 5/2003 |
| DE | 202011106232 | 11/2011 |
| FR | 725505 | 5/1932 |
| GB | 123605 | 3/1919 |
| GB | 2318072 | 4/1998 |
| GB | 2405820 | 3/2005 |
| JP | 63016912 | 1/1988 |
| JP | H0435812 | 3/1992 |
| KR | 200163679 | 2/2000 |
| WO | 9731741 | 9/1997 |
| WO | 2008092386 | 8/2008 |
| WO | 2012167448 | 12/2012 |
| WO | 2013077857 | 5/2013 |
| WO | 2018120274 | 7/2018 |
| WO | 2019147885 | 8/2019 |
| WO | 2020031259 | 2/2020 |
| WO | 2020092462 | 5/2020 |
| WO | 2020165378 | 8/2020 |

OTHER PUBLICATIONS

International Search Report and Written Opinion for PCT Application No. PCT/CN2022/134173 mailed May 20, 2023, 8 pages.
International Search Report and Written Opinion for PCT Application No. PCT/CN2022/134173 mailed Feb. 29, 2024, 8 pages.
Matco Tools, "Matco Exclusive Hyper-Step Drill Bits", 2018, 1 page.
Society of Manufacturing Engineers, "Tool and Manufacturing Engineers Handbook", 4th Edition, vol. 1, Machining, 1998, 147 pages.
Viking Drill & Tool Catalog, 2014, 3 pages.
Viking Drill & Tool Catalog, 2015, 142 pages.
Intes Partes Review, IPR2023-00473, Final Written Decision of the Patent Trial and Appeal Board, U.S. Pat. No. 11,007,583, Paper No. 82, 79 pages.
Intes Partes Review, IPR2023-00474, Final Written Decision of the Patent Trial and Appeal Board, U.S. Pat. No. 11,007,584, Paper No. 89, 56 pages.
European Search Report for Application No. 24194398.4 dated Nov. 18, 2024, 9 pages.

TWIST DRILL

CROSS-REFERENCES TO RELATED APPLICATIONS

This application is a continuation of U.S. patent application Ser. No. 18/095,119, filed on Jan. 10, 2023, soon to be issued as a U.S. Patent, which is a continuation of U.S. patent application Ser. No. 17/321,373, filed on May 14, 2021, soon to be U.S. Pat. No. 11,554,424, which is a continuation of U.S. patent application Ser. No. 17/094,786, filed on Nov. 10, 2020, now U.S. Pat. No. 11,007,584, which is a continuation of U.S. patent application Ser. No. 16/699,089, filed on Nov. 28, 2019, now U.S. Pat. No. 11,007,583, which is a continuation-in-part of U.S. patent application Ser. No. 15/847,900 filed on Dec. 19, 2017, now abandoned, which is a continuation-in-part of International Patent Application No. PCT/CN2016/073767, now expired, filed on Feb. 14, 2016. The contents of each of the aforementioned applications, including all intervening amendments thereto, are incorporated herein by reference in its entirety.

BACKGROUND OF THE INVENTION

Field of the Invention

The application relates to metal cutting and metal cutting tools, more particularly, to a twist drill.

Description of the Related Art

Figure 1A:
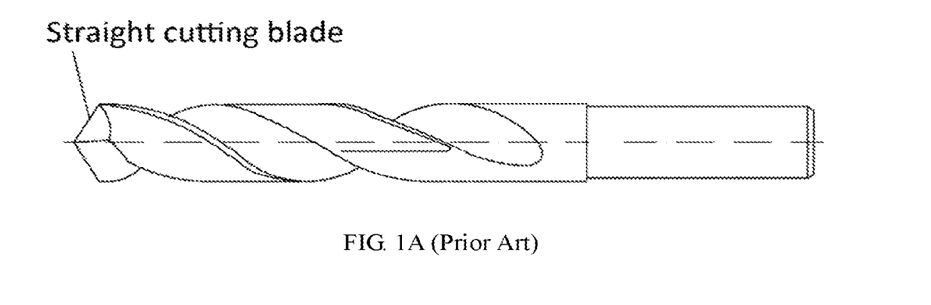
FIGS. 1A-1C are schematic diagrams of a normal twist drill in the prior art.
Figure 1B:
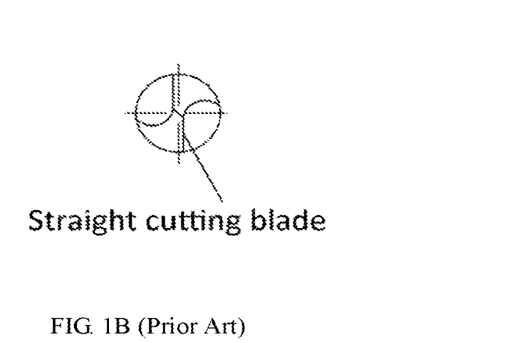
Figure 1C:
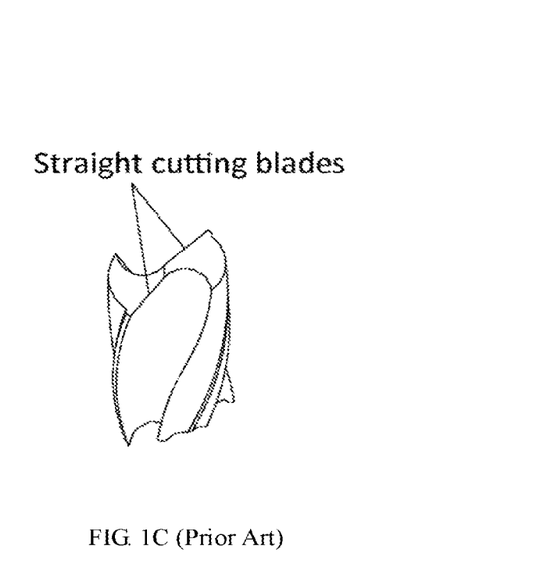

FIGS. 1A-B are schematic diagrams of a conventional twist drill. FIG. 1A is a front view of the twist drill; FIG. 1B is a top view of a drill tip; and FIG. 1C is a perspective view of a truncate twist drill. Twist drills are commonly used in the places away from other metal cutting machines such as drill presses, and when a hand-held electric tool is used for the drilling operation, the drilling efficiency is greatly constrained due to limitations of arm strength of a worker, power of the electric tool and the like. Thus, the existing twist drill is difficult to position the drill hole, and low in speed and efficiency.

Figure 2:
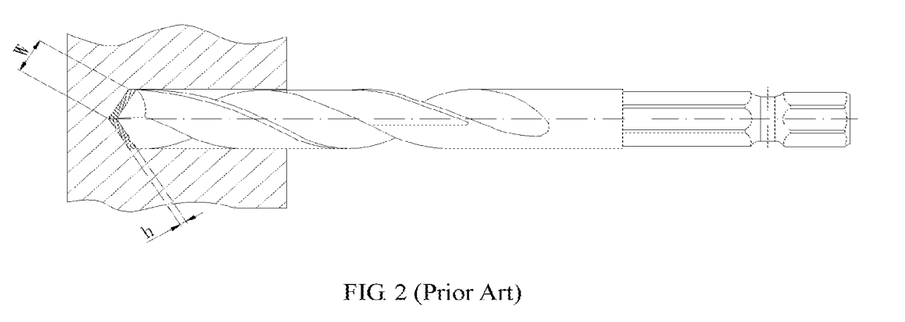
FIG. 2 shows a cutting of a cutting blade of a normal twist drill in the prior art during drilling.

FIG. 2 shows the cutting process of the twist drill in the prior art of FIGS. 1A-C. When the twist drill with such a conventional structure is used for drilling, the processing of a metal cutting amount in a corresponding size is simultaneously completed by two symmetrically distributed linear cutting edges, so that a relatively large power is required during drilling. Meanwhile, relatively large reaction forces are also applied onto two cutting edges, so the cutting edges are easy to be damaged.

SUMMARY OF THE INVENTION

The present invention provides the following technical solutions to solve the technical problems that a twist drill in the prior art is difficult to position the drill hole, and low in speed and efficiency.

The present invention provides a twist drill, comprising: a shank portion and an operation portion connected to the shank portion; the operation portion comprises a cone portion and a cylinder portion which is fixedly connected to the cone portion; a spiral flute for shunting cutting chips is provided on an exterior surface of the operation portion, and the spiral flute is wound from a front end of the cone portion to the cylinder portion.

A plurality of composite cutting blade groups are provided on the exterior surface of the cone portion, and diameters of the composite cutting blade groups sequentially increase from the front end to a rear end of the cone portion; and the composite cutting blade groups each comprise a first step surface and a second step surface which are adjacent.

A top blade is provided on a tip of the cone portion.

In some embodiments, top ends of flute sidewalls of the spiral flute form a plurality of spiral lines.

An intersection of the first step surface and the flute sidewall of the spiral flute is a major cutting edge; an intersection of the second step surface and the flute sidewall of the spiral flute is a minor cutting edge; and an intersection of the major cutting edge and the minor cutting edge is a cutting tip of the composite cutting blade groups, and cutting tips of the composite cutting blade groups are distributed on the spiral lines.

In some embodiments, a flank surface of the major cutting edge close to the major cutting edge and a back portion of the major cutting edge away from the major cutting edge are provided at the first step surface; a flank surface of the minor cutting edge close to the minor cutting edge and a back portion of the minor cutting edge away from the minor cutting edge are provided at the second step surface.

The major cutting edge, the minor cutting edge and the cutting tip form a composite blade group, and a cutting tooth unit corresponding to the composite blade group is a three-sided prism formed by a rake surface, the flank surface of the major cutting edge and the flank surface of the minor cutting edge, wherein the rake surface is arranged on the sidewall of the spiral flute close to the composite blade group.

In some embodiments, each of the composite cutting blade groups is coaxial with the cone portion; and angles of the composite cutting blade groups are determined by different linear velocities of the composite cutting blade groups with different diameters.

In some embodiments, a helix angle $\Omega_0$ is an angle of the spiral lines and an axis of the cone portion, and angles of each of the composite cutting blade groups comprise:
 an entering angle $\kappa_r$ ranging from 10° to 80°;
 an auxiliary angle $\kappa_r$ ranging from 0.5° to 5°;
 a normal relief angle $\alpha_n$ ranging from 0.5° to 8°;
 a normal rake angle $\gamma_n$ ranging from $-\gamma_n$ to $+\gamma_n$, which is determined by the flute sidewalls of the spiral flute;
 a major cutting edge inclination angle $\lambda_s$ ranging from $-\lambda_s$ to $+\lambda_s$, which is determined by the sidewalls of the spiral flute and the entering angle $\kappa_r$;
 a minor cutting edge inclination angle $\lambda_{s'}$ ranging from >0° to $+\lambda_{s'}$, which is determined by the helix angle $\Omega_0$ and the auxiliary angle $\kappa_r$;
 an axial major cutting edge inclination angle $\lambda_{zz}$ ranging from $-\lambda_{zz}$ to $+\lambda_{zz}$, which is determined by the position of the sidewalls of the spiral flute (a core thickness of the drill), the helix angle $\Omega_0$ and the entering angle $\kappa_r$;
 an axial minor cutting edge inclination angle $\lambda_{fz}$ ranging from >0° to $+k_{fz}$, which is determined by the helix angle $\Omega_0$ and the auxiliary angle $\kappa r'$;
 an axial relief angle $\alpha_{wz}$ of the major cutting edge ranging from >0° to $+\alpha_{wz}$, which is determined by the normal relief angle $\alpha_n$ and the auxiliary angle $\kappa_r$;
 wherein respective cutting tooth units have different normal rake angles $\gamma_n$, major cutting edge inclination angles $\lambda_s$, minor cutting edge inclination angles $\lambda_{s'}$, axial major cutting edge inclination angles $\lambda_{zz}$, axial minor cutting edge inclination angles $\lambda_{fz}$ and axial relief angles $\alpha_{wz}$ of the major cutting edge.

In some embodiments, heights of the composite cutting blade groups arranged on the exterior surface of the cone portion from the front end to the rear end are varied irregularly.

In some embodiments, the top blade comprises a chisel edge, two auxiliary cutting edges and two straight major cutting edges, and the auxiliary cutting edge is respectively intersected with the straight major cutting edge and the chisel edge.

In some embodiments, the cone portion is coaxial with the cylinder portion, and a diameter of a composite cutting blade group at the rear end of the cone portion is equal to a diameter of the cylinder portion; the diameter of the cylinder portion is the drill size of the twist drill, and a web thickness of the top edge is less than the web thickness of the normal twist drill with the same size.

In some embodiments, the cylinder portion is formed by the spiral flute and a spiral blade back, and a spiral margin is located in the spiral flute. In some embodiments, formulas for calculating a cross section area Sn of a cutting chip of an n-th composite cutting group and a total cutting area of the twist drill are as follows:

$$S1 = W1 \times h1;$$

$$Si = Wi \times hi;$$

$$Sn = Wn \times hn;$$

$$S(\text{single flute}) = S1 + \ldots + Si + \ldots + Sn;$$

$$Sz(\text{double flutes}) = 2S = 2(S1 + \ldots + Si + \ldots + Sn)$$

where Sn is the cross section area of the cutting chip of the n-th composite cutting blade group; Wn is the length of the major cutting edge of the n-th composite cutting blade group; hn is the thickness of the cutting chip of the n-th composite cutting blade group; S (single flute) or Sz (double flutes) is the total cross section area of the cutting chips of the twist drill.

The present invention provides a twist drill, and a cone portion is provided at a front end of the operating portion, and an exterior surface of the operating portion is provided with a spiral flute for shunting cutting chips; the exterior surface of the cone portion is provided with a plurality of composite cutting blade groups which sequentially increase in diameter from the front end to the rear end, and the cone portion is provided with the top blade of the drill tip on the tip. During use, the top edge is used for positioning, and the cutting process is carried out by the top blade and the composite cutting blade groups.

Since diameters of the top edge and the composite cutting blade groups sequentially increase from the front end to the rear end, the cutting allowance of the object to be cut is reasonably distributed according to the diameter of the drill hole, and the object to be cut is gradually cut. The cutting force is dispersed on each cutting blade, and the reaction force of each cutting blade is reduced, and fewer burrs are generated on the edge of cutting blade, which allows a smoother drilling process and a higher drilling efficiency.

The existing twist drill provides two straight main blades which are symmetrical to process the metal drilling amount in a corresponding size, which results in a larger power for drilling, and at the same time, the two cutting blades suffer large reaction forces, so the cutting blades are easily damaged. However, the present invention overcomes above technical problems.

BRIEF DESCRIPTION OF THE DRAWINGS

In order to more clearly illustrate the embodiments of the present invention or the technical solutions in the prior art, the accompanying drawings of the embodiments or the prior art will be briefly described below. Obviously, the accompanying drawings in the following description are only a part of the embodiments of the present application, and other drawings based on the structures shown in the accompanying drawings without any creative work can be obtained by those skilled in the art.

DESCRIPTION OF THE PREFERRED EMBODIMENTS

The technical solutions in the embodiments of the present invention are clearly and completely described in the following with reference to the accompanying drawings. It is obvious that the described embodiments are only a part of the embodiments of the present invention. Any other embodiments obtained by the skilled in the art based on the embodiments of the present invention without departing from the inventive scope shall fall within the scope of the present invention.

It should be noted that terms such as "up," "down," "left," "right," "front," "rear" in the embodiments of the present invention are only used to explain the relative position and movement, etc. of components.

In addition, terms "first," "second," and the like in the present invention are used for description only, and are not intended to indicate or imply their relative importance or the number of technical features, which explicitly or implicitly indicates that one or more features defined by "first" or "second" may be included in the present invention. In addition, the technical solutions of various embodiments may be combined to form other embodiments which are considered to fall within the claimed scope.

In the present invention, unless specified, terms "connect," "fix" and the like should be understood broadly. For example, "fix" may result in a fixed connection, a detachable connection, or an integrated configuration of elements. The elements may be connected mechanically or electrically; or directly connected or indirectly connected through an intermediate medium. Alternatively, two elements may be in communication or interact with each other unless specified. For the skilled in the art, the specific meanings of the above terms in the present invention can be understood according to specific conditions.

As shown in FIGS. 3-7, the embodiment of the present invention provides a twist drill 100 comprising a shank portion 2 and an operation portion 1 connected to the shank portion 2. The operation portion 1 comprises a cone portion 11 and a cylinder portion 12 which is fixedly connected to the cone portion 11.

A spiral flute IV for shunting cutting chips is provided on the exterior surface of the operation portion 1, and the spiral flute IV is wound from the front end of the cone portion 11 to the cylinder portion 12.

Figure 4A:
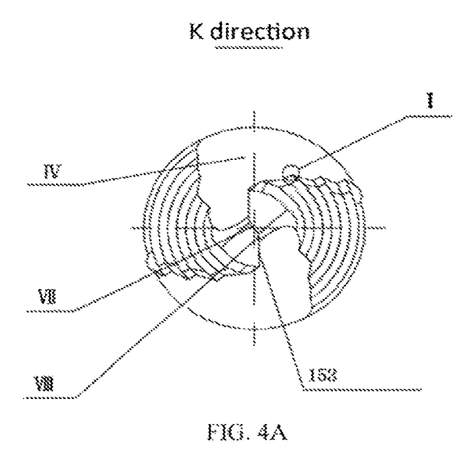
FIG. 4A is a top view of a drill tip of the twist drill alone k direction as indicated by arrow in FIG. 3 according to an embodiment of the present invention.
Figure 4B:
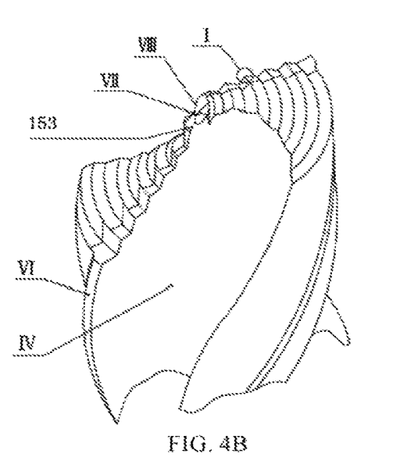
FIG. 4B is a perspective view of a composite blade of the drill tip of the twist drill according to an embodiment of the present invention.

A plurality of composite cutting blade groups are provided on the exterior surface of the cone portion 11, and diameters of the composite cutting blade groups sequentially increase from the front end to a rear end of the cone portion, and the composite cutting blade groups each comprise a first step surface 141 and a second step surface 142 which are adjacent. As shown in FIGS. 4A-4B, a top blade II is provided on a tip of the cone portion 11, and comprises a chisel edge VII, two auxiliary cutting edges VIII and two straight major cutting edges 153.

Figure 3:
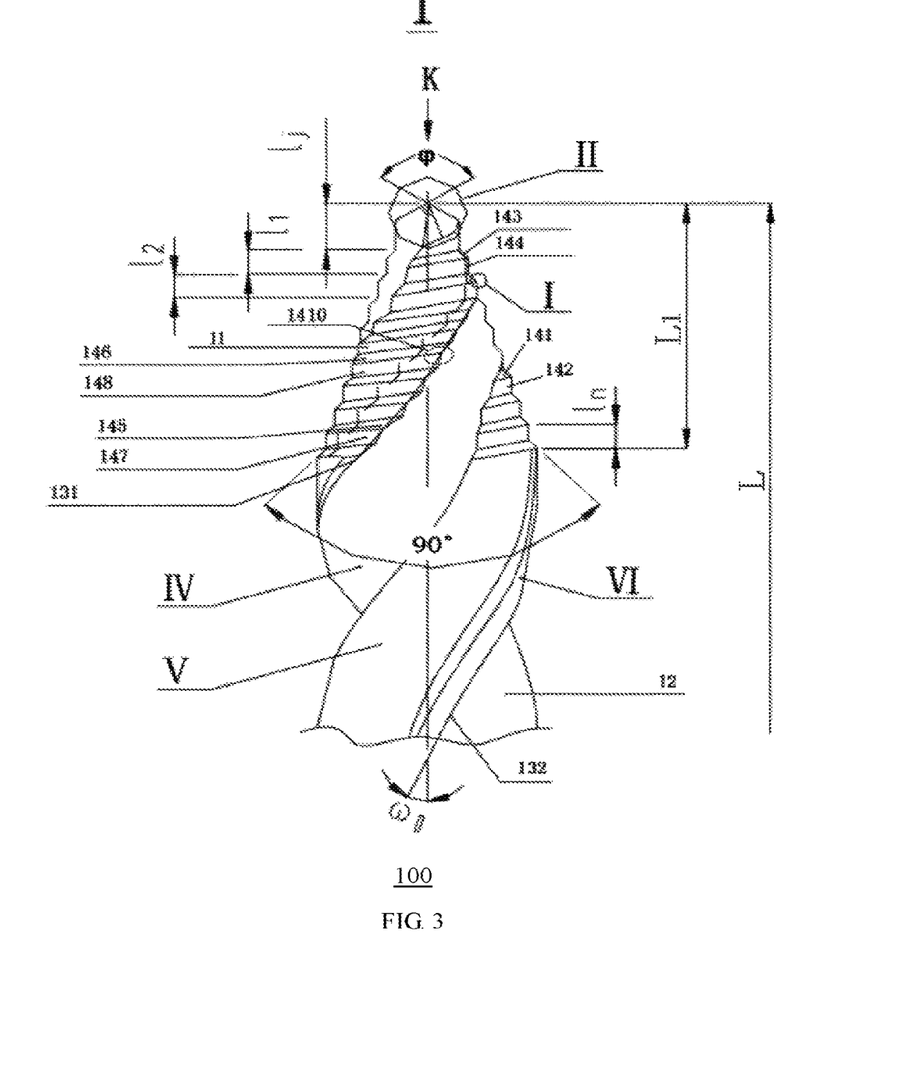
FIG. 3 is a schematic diagram of a twist drill according to an embodiment of the present invention.

As shown in FIGS. 3, 4A-4B, at the cone portion 11, the cone surface intersects with the sidewalls of the spiral flute IV to form a plurality of first spiral lines 131; at the cylinder portion 12, the cylinder surface intersects with the front sidewall of the spiral flute IV to form a second spiral line 132.

Further, the cylinder portion 12 is formed by a spiral blade back V and the spiral flute IV, and a spiral margin VI is located on the spiral flute IV and the spiral blade back V.

An intersection of the first step surface 141 and the front flute sidewall of the spiral flute IV is a major cutting edge 143; an intersection of the second step surface 142 and the front flute sidewall of the spiral flute IV is a minor cutting edge 144; and an intersection of the major cutting edge 143 and the minor cutting edge 144 is a cutting tip 1411 of a composite cutting blade group, and cutting tips of the composite cutting blade groups are distributed on the spiral lines 131. The cutting tips of the composite cutting blade groups are distributed on two first spiral lines 131, and such distribution is critical to efficiency, quality, power, etc. of the drilling.

FIG. 4A is a top view (K direction) of the twist drill 100, and FIG. 4B is a perspective view of the composite cutting blade group. Specifically, as shown in FIGS. 4A-4B, two spiral lines 131 are formed, and the cutting tips of the composite cutting blade groups are distributed on the two spiral lines 131. Alternatively, three, four or five spiral lines 131 can also be designed according to the drill core size of the twist drill 100, which will not be limited by the present invention.

As shown in FIG. 3, a flank relief surface 145 of the major cutting edge close to the major cutting edge 143 and a back portion 146 of the major cutting edge away from the major cutting edge 143 are provided at the first step surface 141; a flank surface 147 of the minor cutting edge close to the minor cutting edge 144 and a back portion 148 of the minor cutting edge away from the minor cutting edge 144 are provided at the second step surface 142.

The major cutting edge 143, the minor cutting edge 144 and the cutting tip 1411 form a composite blade group (shown in FIGS. 5A-5C), and the cutting tooth unit 1410 corresponding to the composite blade group is a three-sided prism formed by a rake surface 133, the flank surface 145 of the major cutting edge 143 and the flank surface 147 of the minor cutting edge 144, and the rake surface 133 is a surface of the sidewall in the spiral flute IV for connecting the major cutting edge 143 and the minor cutting edge 144.

A surface on which the back portion 146 of the major cutting edge is located can be approximately regarded as a conical surface, so the back portion 146 can be considered as a conical major cutting edge back. The back portion 148 of the minor cutting edge can be approximately regarded as a cylindrical minor cutting edge back. Although the axial minor cutting edge inclination angle is not 0° because the minor cutting edge has a certain chamfer, a surface on which the back portion 148 of the minor cutting edge is located can be approximately regarded as a cylindrical surface.

In some embodiments, each of the composite cutting blade groups is coaxial with the cone portion 11; angles of the composite cutting blade groups are determined by different linear velocities of the composite cutting blade groups with different diameters.

The composite cutting blade groups are distributed on the exterior surface of the cone portion 11 which is coaxial with the twist drill. The major cutting edge 143 is at an angle (e.g., 45°) to the axis of the cone portion 11, and the minor cutting edge 144 are distributed on exterior surfaces of approximate cylinders which have different radius and the same axis. The composite cutting blade groups conically and spirally extend along the rake face 133 of the spiral flute IV towards the shank (shank portion 2) and terminate at the maximum outer diameter of the twist drill 100. In the composite cutting blade groups, the major cutting edge and the axis of the cone portion 11 form a relatively small angle on the conical surface (i.e., the major cutting edge inclination angle inclination angle of the main blade); the minor cutting edge and the axis of the cone portion 11 also have a relatively small axial angle (i.e., the minor cutting edge inclination angle) along the axial direction. The major cutting edge inclination angle and the minor cutting edge inclination angle can be determined by the helix angle of the spiral line and the drill core thickness, respectively. Diameters of the composite cutting blade groups are diameters of respective segments of the cylinder.

In FIG. 3, IV represents the spiral flute; V represents the spiral blade back; VI represents the spiral margin; $\Omega_0$ represents the helix angle of the twist drill; φ represents the peak (top) angle of the twist drill which usually ranges from i.e., 118° to 135°.

Figures 5A, 5B:
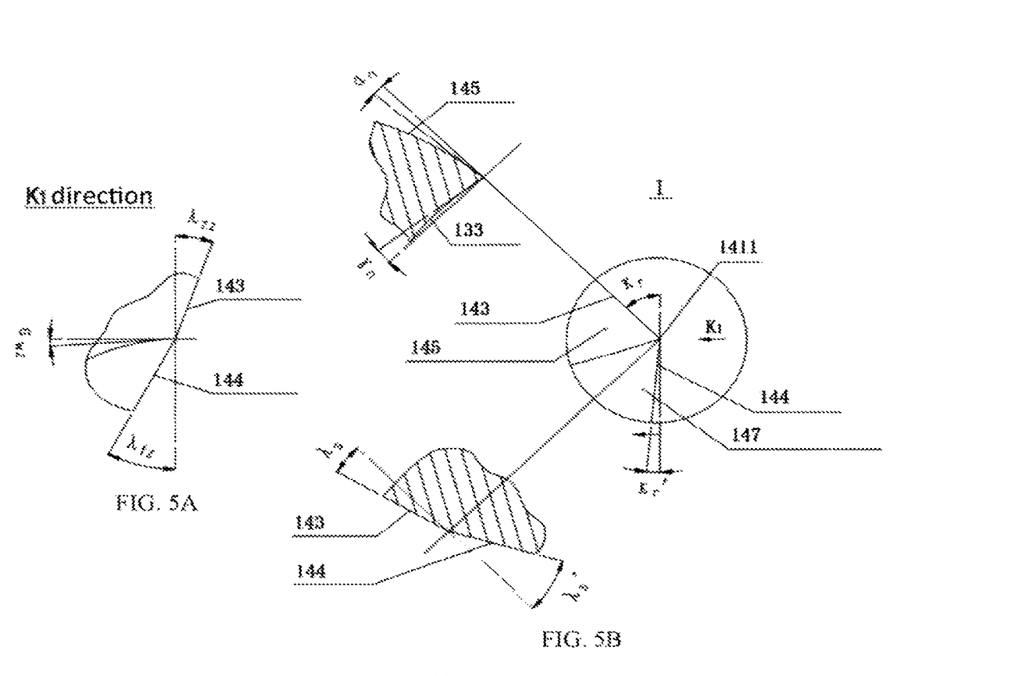
FIG. 5A is a schematic diagram of cutting mechanism along $K_1$ direction as indicated by arrow of FIG. 5B.
FIG. 5B shows the relationship between working faces and cutting angles of a composite blade group of a twist drill according to an embodiment of the present invention.
Figure 5C:
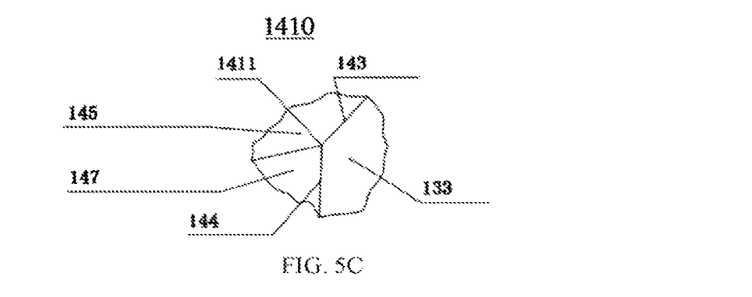
FIG. 5C is a perspective view of a cutting tooth unit according to an embodiment of the present invention.

The angle of a projection of the spiral lines 131 and the axis of the cone portion 11 is a helix angle $\Omega_0$. FIGS. 5A-5C are schematic diagrams showing a cutting mechanism and a relationship between working faces and cutting angles of a composite blade unit I of a twist drill 100 according to an embodiment of the present invention. As shown in FIGS. 5A-5C, angles of each of the composite cutting blade units comprise:

an entering angle $\kappa_r$, ranging from 100 to 80°;
an auxiliary angle $\kappa_r$', ranging from 0.5° to 5°;
a normal relief angle $\alpha_n$ ranging from 0.5° to 8°;
a normal rake angle $\gamma_n$ ranging from $-\gamma_n$ to $+\gamma_n$, which is determined by the flute sidewalls of the spiral flute;
a major cutting edge inclination angle $\lambda_s$ ranging from $-\lambda_s$ to $-\lambda_s$, which is determined by the position of the sidewalls of the spiral flute IV (i.e., core thickness of the drill) and the entering angle $\kappa_r$;
a minor cutting edge inclination angle $\lambda s$' ranging from 0° (exclusive) to $+_{s'}$, which is determined by the helix angle $\Omega_0$ and the auxiliary angle $\kappa_r$;

an axial major cutting edge inclination angle $\lambda_{zz}$ ranging from $-\kappa_{zz}$ to $+\lambda_{zz}$, which is determined by the positions of the sidewalls of the spiral flute, the helix angle $\Omega_0$ and the entering angle $\kappa_r$;

an axial minor cutting edge inclination angle $\lambda_{fz}$ ranging from $>0°$ to $+k_{fz}$, which is determined by the helix angle $\Omega_0$ and the auxiliary angle $\kappa_{r'}$;

an axial relief angle $\alpha_{wz}$ of the major cutting edge ranging from $>0°$ to $+\alpha_{wz}$, which is determined by the normal relief angle $\alpha n$, the entering angle $\kappa_r$ and the auxiliary angle $\kappa_{r'}$.

Respective cutting tooth units have different normal rake angles $\gamma_n$, major cutting edge inclination angle $\lambda s$, minor cutting edge inclination angle $\lambda_{s'}$, axial major cutting edge inclination angle $\lambda_{zz}$, axial minor cutting edge inclination angle $\lambda_{fz}$ and axial relief angles $\alpha_{wz}$ of the major cutting edge.

A composite cutting blade group is also called a composite cutting blade unit I which comprises a major cutting edge 143, a minor cutting edge 144 and a cutting tip 1411. The cutting tooth unit 1410 is a three-sided (rib) prism formed by a rake surface 133 (front sidewall of the twist drill flute), a flank surface 145 of the major cutting edge and a flank surface 147 of the minor cutting edge.

The diameters of the composite cutting blade groups sequentially increase from the front end to the rear end of the exterior surface of the cone portion 11. Alternatively, in some embodiments, diameters of the composite cutting blade groups uniformly or irregularly increase. The diameters of the composite cutting blade groups are designed according to the drill core size of the twist drill 100 and the drill size, the drill depth, the material of work piece, the situation of the tools, etc., which are not limited herein.

Further, heights of the composite blade groups arranged on the exterior surface of the cone portion 11 from the front end to the rear end varies uniformly or irregularly. As shown in FIG. 3, $l_1, l_2, l_3 \ldots l_n$ are heights of respective composite cutting blade groups. The portion with a length of $L_1$ is the composite drill tip; the portion with the length of $l_j$ is the drill tip; lengths of $l_1, l_2, l_3 \ldots l_n$ correspond to the heights of respective composite cutting blade groups. The total length of the cone portion 11 of the twist drill 100 is $L_1$, and the total length of the twist drill 100 is L. Specifically, $l_n$ is greater than, less than, or equal to $l_n-1$, which can be designed according to the required type and property of drilling.

Such cutting tooth has better cutting strength, and is easy to process a proper cutting angle and has a wider application.

Figure 6A:
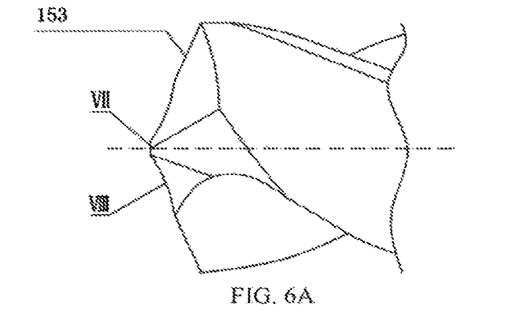
FIGS. 6A-6C are close-up views of a top blade of a drill tip of a twist drill according to an embodiment of the present invention.
Figure 6B:
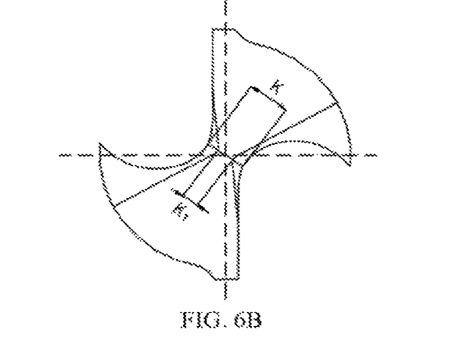
Figure 6C:
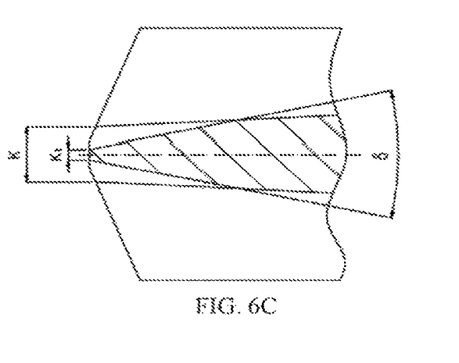

FIGS. 6A-6C are close-up views of the top blade II in FIG. 3 of the twist drill 100. FIG. 6A is a close-up front view of the top blade II in FIG. 3, and FIG. 6B is the close-up left view of the top blade II in FIG. 3, and FIG. 6C is a diagram showing web thickness comparison of drill cores. As shown in FIGS. 4A-4B and 6A-6C, the top blade II comprises a chisel edge VII, two auxiliary cutting edges VIII and two straight major cutting edges 153, and the auxiliary cutting edge VIII is respectively intersected with the straight major cutting edge 153 and the chisel edge VII, where the chisel edge of the original drill is shortened, so that axial resistance of the drill is reduced during drilling.

As shown in FIGS. 4A-4B, the top blade II of the drill tip comprises a chisel edge VII, two auxiliary edges VIII and two straight major cutting edges 153. The composite cutting blade groups with different lengths of $l_1, l_2, l_3 \ldots l_n$ extend axially towards the shank portion of the twist drill 100 along the two first spiral lines 131 (shown in FIGS. 3, 4A-4B) to the two spiral margins VI of the cylinder portion 12 of the twist drill 100, such that an operating portion 1 of the twist drill is formed.

In some embodiments, the cone portion 11 is coaxial with the cylinder portion 12. A diameter of the composite cutting blade group at the rear end of the cone portion 11 is equal to a diameter of the cylinder portion 12, and the diameter of the cylinder portion 12 is the drill size of the twist drill 100, and the web thickness of the top blade II is less than the web thickness of the original twist drill. FIG. 6C is a diagram showing the web thickness comparison, where:

K is an original web thickness on the drill tip of the original twist drill;

$K_1$ is a web thickness on the drill tip of the twist drill 100;

$\delta$ is the included angle of trimmed web thickness.

The standard web thickness of the normal twist drill is determined by the outer diameter thereof. In case of using a hand tool, when the outer diameter of the drill bit is large, the twist drill (shown in FIGS. 1A-1C) in the prior art, has a large web thickness and a large chisel edge. Thus, during drilling, the axial resistance increases, and the drilling needs a large drilling force and is time-consuming, and the twist drill is hard to be positioned.

Therefore, the number of the composite blade groups should be as much as possible, and the first composite blade group is required to have a smaller diameter. At the same time, the diameter of the first composite blade group is limited by the web thickness of the drill bit. Therefore, the web thickness of the twist drill should be concern to a standard web thickness. For the twist drill with a larger diameter, when the diameter of the first composite blade group is smaller than the web thickness thereof, the grinding process for the chisel edge is added to reduce the web thickness to reduce the cutting force and keep a good positioning performance. In this embodiment, the drill web thickness $K_1$ of the top group II is much smaller than the original drill web thickness K of the normal twist drill, and the centering for such drill tip is easy and accurate.

As shown in FIGS. 1A-1C and 2, the existing twist drill carries out the cutting for a metal with a corresponding size using two symmetrically distributed straight major cutting edges, where:

cutting area of a single blade: $S1=S2=W \times h$;

total cutting area: $S=2S1=2S2=2 \times W \times h$.

Figure 7:
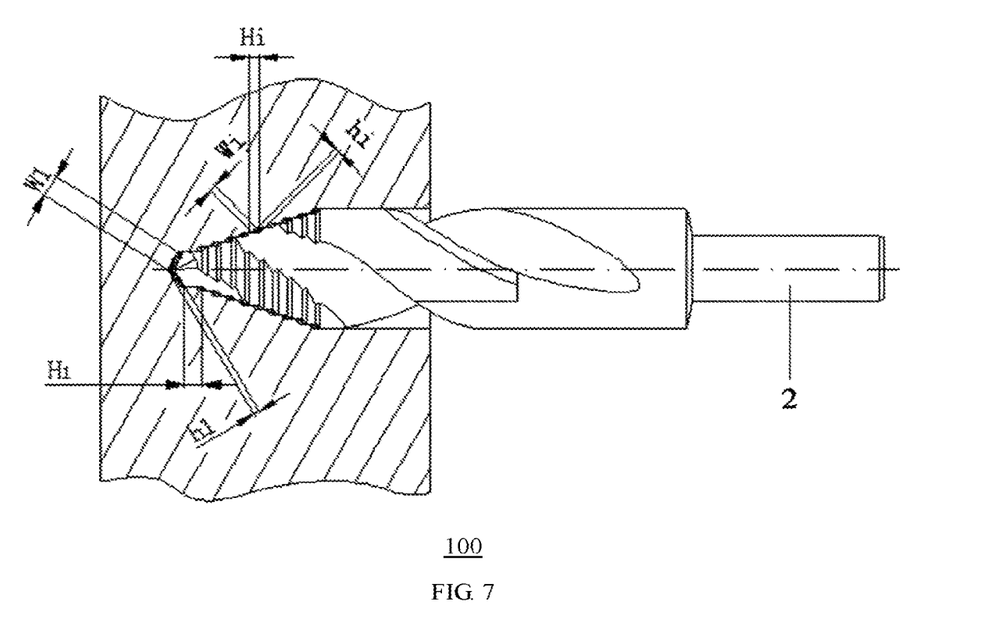
FIG. 7 shows the cutting of a cutting blade of a twist drill according to an embodiment of the present invention.

In some embodiments, the shank portion of the twist drill 100 can be in various forms, such as a hex shank or round shank or the like. FIG. 7 shows the cutting of the cutting blade of the twist drill 100 with the round shank portion during drilling, and the parameters of the top blade II of the drill tip and the composite cutting blade groups are marked.

Formulas for calculating the cutting area Sn of the n-th composite cutting group and the total cutting area of the twist drill 100 are as follows:

$$S1 = W1 \times h1;$$

$$Si = Wi \times hi;$$

$$Sn = Wn \times hn;$$

$$S(\text{single flute}) = S1 + \ldots + Si + \ldots + Sn;$$

$$Sz(\text{double flutes}) = 2S = 2(S1 + \ldots + Si + \ldots + Sn)$$

where Sn is the cross section area of the cutting chip of the n-th composite cutting blade group; Wn is the length of the major cutting edge of the n-th composite cutting blade group; hn is the thickness of the cutting chip of the n-th composite cutting blade group; S (single flute) or Sz (double flute) is the total cross section area of the cutting chip of the twist drill 100.

A length of the major cutting edge at the drill tip is W1, and the major cutting edge of the composite cutting blade has a length of Wi, where W1>Wi; W1 is much smaller than the cutting edge length W of the conventional twist drill, Wi is much smaller than the cutting edge length W of the conventional twist drill, which disperses the width of the cutting layer. The cutting edge thickness of each cutting layer of the composite cutting blade is hi, and a cutting thickness h1 at the drill tip is greater than or equal to the thickness h of the cutting layer of the conventional twist drill, where h1=hi, which increases the amount of cutting (i.e., the feed rate). A length of the minor cutting edge at the drill tip is H1, and a length of each cutting edge of the composite cutting blade is Hi, where H1>Hi. The minor cutting edge of the composite cutting blade has a certain axial auxiliary angle (also known as a side clearance angle), so it only act as to smooth (rather than cut) the surface of the machined surface, thereby improving the surface quality. During manufacturing, the chisel edges of the conventional twist drill (shown in FIGS. 1A-1C) are ground to reduce by 80 to 90% to form chisel edges of the twist drill 100 of the present invention; and two auxiliary edges (inner edges) are formed, and rake angles of the inner edges increase from −60°~10°, which reduces the axial resistance by more than 50%. Therefore, the axial feed of the twist drill 100 is quick and the cutting heat at the chisel edge of the drill tip is greatly reduced.

As the axial force of the twist drill is improved, the centering accuracy is also greatly improved, and the composite cutting blade groups can achieve a multi-stage centering, which greatly improves the smoothness, roundness and precision of the drilling.

Moreover, the composite cutting blade groups are able to crush chips into multiple sections, that is, to crush the removed metal chips to finer chips which are easy to remove. Angles of the composite cutting blade groups are reasonably designed according to different linear velocities of the composite cutting blade groups with different diameters, so the torque resistance is greatly reduced, and the generation and gathering of the cutting heat are reduced, and the cutting blade wear is reduced. The uneven wear of the cutting edges with different diameters caused by the different cutting linear speeds is improved, causing easier drilling, an increased drilling efficiency and an extended lifetime of the drill bit.

In summary, a twist drill 100 is illustrated in the embodiment of the present invention. A cone portion 11 is provided at a front end of the operating portion 1, and an exterior surface of the operating portion 1 is provided with a spiral flute IV for shunting cutting chips; the exterior surface of the cone portion 11 is provided with a plurality of composite cutting blade groups which sequentially increase in diameter from the front end to the rear end, and the cone portion 11 is provided with the top blade II on the tip. In use, the twist drill is positioned by the top blade II of the drill tip, and the cutting process is carried out by the top blade II of the drill tip and the composite cutting blade groups. Since the diameter of the top blade II of the drill tip and the composite cutting blade groups sequentially increase from the front end to the rear end, the cutting allowance of the object to be cut is properly distributed according to the diameter of the drill hole, and the drilling process needs a small drilling force, and the applied drilling force is even and appropriate, so that the object to be cut is gradually cut. The cutting force is dispersed on each cutting blade, and the reaction force of each cutting blade is reduced, so the hand-held power tool is stable and can be operated for a long time. Burrs on the edge of cutting blade is reduced, which allows a smoother drilling and a higher drilling efficiency. The precision of the drilling is guaranteed while equipment or personal accidents are avoided. The wear of the cutting blades is uniformly, which prolongs the lifetime of the twist drill, and reduces unnecessary damages of the tool and the scrapping of the workpiece in use. Thus, the processing difficulty and cost are reduced, and the processing efficiency is improved.

The above is only a preferred embodiment of the present invention, which is not intend to limit the scope of the present invention. Any equivalent variations based on the content of the specification and the drawings of the present application shall fall within the scope of the present invention.

What is claimed is:

1. A twist drill comprising:
   a shank portion;
   an operating portion axially fixed to the shank portion, the operating portion comprising a cylinder portion, a cone portion axially fixed to the cylinder portion, and a spiral flute having a sidewall and being formed into an exterior surface of the operating portion extending from a front end of the cone portion and at least partway up the cylinder portion, the shank portion axially fixed to the cylinder portion opposite the cone portion;
   a plurality of four or more composite cutting blade groups formed sequentially on a cone portion exterior from the front end of the cone portion to a rear end of the cone portion, and diameters of the composite cutting blade groups sequentially increase from the front end to the rear end of the cone portion, each of the plurality of composite cutting blade groups comprising:
   a first step surface;
   a second step surface adjacent to the first step surface,
   a major cutting edge defined by an intersection of the first step surface and the sidewall of the spiral flute;
   a minor cutting edge defined by an intersection of the second step and the sidewall of the spiral flute; and
   a cutting tip defined by an intersection of the major cutting edge, the minor cutting edge, and the sidewall of the spiral flute; and
   a top blade provided on the front end of the cone portion, wherein a plurality of said cutting tips forms a spiral pattern on the cone portion exterior; the second step surface of at least one composite cutting blade group is immediately adjacent to the first step surface of a next composite cutting blade group; and the cylinder portion is longer than the cone portion.

2. The twist drill of claim 1, wherein the cone portion has an acute effective apex angle.

3. The twist drill of claim 1, wherein the operating portion is configured to disperse a cutting force on each of the plurality of composite cutting blade groups within a drill hole of a workpiece when at least a portion of the cylinder portion is also within the workpiece.

4. A twist drill comprising:
   a shank portion;
   an operating portion axially fixed to the shank portion, the operating portion comprising a cylinder portion, a cone portion axially fixed to the cylinder portion, said cone portion having an acute effective apex angle, and a spiral flute having a sidewall and being formed into an exterior surface of the operating portion extending from a front end of the cone portion and at least partway up the cylinder portion, the shank portion axially fixed to the cylinder portion opposite the cone portion;

a plurality of composite cutting blade groups formed sequentially on a cone portion exterior from the front end of the cone portion to a rear end of the cone portion, and diameters of the composite cutting blade groups sequentially increase from the front end to the rear end of the cone portion, each of the plurality of composite cutting blade groups comprising:

a first step surface;

a second step surface adjacent to the first step surface, a major cutting edge defined by an intersection of the first step surface and the sidewall of the spiral flute;

a minor cutting edge defined by an intersection of the second step and the sidewall of the spiral flute; and a cutting tip defined by an intersection of the major cutting edge, the minor cutting edge, and the sidewall of the spiral flute; and a top blade provided on the front end of the cone portion, wherein a plurality of said cutting tips forms a spiral pattern on the cone portion exterior; the second step surface of at least one composite cutting blade group is immediately adjacent to the first step surface of a next composite cutting blade group; and the cylinder portion is longer than the cone portion.

5. The twist drill of claim 4, wherein the plurality of composite cutting blade groups comprises four or more composite cutting blade groups.

6. The twist drill of claim 4, wherein the operating portion is configured to disperse a cutting force on each of the plurality of composite cutting blade groups within a drill hole of a workpiece when at least a portion of the cylinder portion is also within the workpiece.

7. A twist drill, comprising:

an operating portion comprising a cone portion and a cylinder portion axially fixed to the cone portion;

a shank portion axially fixed to the cylinder portion opposite the cone portion;

a spiral flute formed on an exterior surface of the operating portion extending from a front end of the cone portion and at least partway up the cylinder portion, the spiral flute having a sidewall;

a plurality of four or more composite cutting blade groups formed sequentially on a cone portion exterior from the front end of the cone portion to a rear end of the cone portion, each of the plurality of composite cutting blade groups comprising:

a first step surface;

a second step surface adjacent to the first step surface, a major cutting edge defined by an intersection of the first step surface and the sidewall of the spiral flute;

a minor cutting edge defined by an intersection of the second step and the sidewall of the spiral flute; and a cutting tip defined by an intersection of the major cutting edge, the minor cutting edge, and the sidewall of the spiral flute; and a top blade provided on the front end of the cone portion, wherein a plurality of said cutting tips forms a spiral pattern on the cone portion exterior; a diameter of each of the plurality of composite cutting blade groups increases sequentially from the front end of the cone portion to the rear end of the cone portion; and wherein a diameter of a composite cutting blade group located at the rear end of the cone portion immediately adjacent to the cylinder portion is less than or equal to a diameter of the cylinder portion; the second step surface of at least one composite cutting blade group is immediately adjacent to the first step surface of a next composite cutting blade group; and the cylinder portion is longer than the cone portion.

8. The twist drill of claim 7, wherein the cone portion has an acute effective apex angle.

9. The twist drill of claim 7 wherein, the operating portion is configured to disperse a cutting force on each of the plurality of composite cutting blade groups within a drill hole of a workpiece when at least a portion of the cylinder portion is also within the workpiece.

10. A twist drill comprising:

an operating portion comprising a cone portion and a cylinder portion axially fixed to the cone portion said cone portion having an acute effective apex angle;

a shank portion axially fixed to the cylinder portion opposite the cone portion;

a spiral flute formed on an exterior surface of the operating portion extending from a front end of the cone portion and at least partway up the cylinder portion, the spiral flute having a sidewall;

a plurality of composite cutting blade groups formed sequentially on a cone portion exterior from the front end of the cone portion to a rear end of the cone portion, each of the plurality of composite cutting blade groups comprising:

a first step surface;

a second step surface adjacent to the first step surface, a major cutting edge defined by an intersection of the first step surface and the sidewall of the spiral flute;

a minor cutting edge defined by an intersection of the second step and the sidewall of the spiral flute; and a cutting tip defined by an intersection of the major cutting edge, the minor cutting edge, and the sidewall of the spiral flute; and a top blade provided on the front end of the cone portion, wherein a plurality of said cutting tips forms a spiral pattern on the cone portion exterior; a diameter of each of the plurality of composite cutting blade groups increases sequentially from the front end of the cone portion to the rear end of the cone portion; and wherein a diameter of a composite cutting blade group located at the rear end of the cone portion immediately adjacent to the cylinder portion is less than or equal to a diameter of the cylinder portion; the second step surface of at least one composite cutting blade group is immediately adjacent to the first step surface of a next composite cutting blade group; and the cylinder portion is longer than the cone portion.

11. The twist drill of claim 10, wherein the plurality of composite cutting blade groups comprises four or more composite cutting blade groups.

12. The twist drill of claim 10, wherein the operating portion is configured to disperse a cutting force on each of the plurality of composite cutting blade groups within a drill hole of a workpiece when at least a portion of the cylinder portion is also within the workpiece.

13. A twist drill, comprising:

an operating portion comprising a cone portion and a cylinder portion axially fixed to the cone portion;

a shank portion axially fixed to the cylinder portion opposite the cone portion;

a spiral flute formed on an exterior surface of the operating portion extending from a front end of the cone portion and at least partway up the cylinder portion, the spiral flute having a sidewall;

a plurality of four or more composite cutting blade groups formed sequentially on a cone portion exterior from the front end of the cone portion to a rear end of the cone portion, each of the plurality of composite cutting blade groups comprising:
a first step surface;
a second step surface adjacent to the first step surface,
a major cutting edge defined by an intersection of the first step surface and the sidewall of the spiral flute;
a minor cutting edge defined by an intersection of the second step and the sidewall of the spiral flute; and
a cutting tip defined by an intersection of the major cutting edge, the minor cutting edge, and the sidewall of the spiral flute;
a top blade provided on the front end of the cone portion, wherein a plurality of said cutting tips forms a spiral pattern on the cone portion exterior; a diameter of each of the plurality of composite cutting blade groups increases sequentially from the front end of the cone portion to the rear end of the cone portion; and
wherein a diameter of a last composite cutting blade group located at the rear end of the cone portion immediately adjacent to the cylinder portion is less than or equal to a diameter of the cylinder portion; the second step surface of at least one composite cutting blade group is immediately adjacent to the first step surface of a next composite cutting blade group; and the cylinder portion is longer than the cone portion.

14. The twist drill of claim 13, wherein the cone portion has an acute effective apex angle.

15. The twist drill of claim 13, wherein the operating portion is configured to disperse a cutting force on each of the plurality of composite cutting blade groups within a drill hole of a workpiece when at least a portion of the cylinder portion is also within the workpiece.

16. A twist drill comprising:
an operating portion comprising a cone portion and a cylinder portion axially fixed to the cone portion said cone portion having an acute effective apex angle;
a shank portion axially fixed to the cylinder portion opposite the cone portion;
a spiral flute formed on an exterior surface of the operating portion extending from a front end of the cone portion and at least partway up the cylinder portion, the spiral flute having a sidewall;
a plurality of composite cutting blade groups formed sequentially on a cone portion exterior from the front end of the cone portion to a rear end of the cone portion, each of the plurality of composite cutting blade groups comprising:
a first step surface;
a second step surface adjacent to the first step surface,
a major cutting edge defined by an intersection of the first step surface and the sidewall of the spiral flute;
a minor cutting edge defined by an intersection of the second step and the sidewall of the spiral flute; and
a cutting tip defined by an intersection of the major cutting edge, the minor cutting edge, and the sidewall of the spiral flute;
a top blade provided on the front end of the cone portion;
wherein a plurality of said cutting tips forms a spiral pattern on the cone portion exterior; a diameter of each of the plurality of composite cutting blade groups increases sequentially from the front end of the cone portion to the rear end of the cone portion; and each of the plurality of composite cutting blade groups is configured to cut fine chips and the spiral flute is configured to shunt the finer chips; and wherein a diameter of a last composite cutting blade group located at the rear end of the cone portion immediately adjacent to the cylinder portion is less than or equal to a diameter of the cylinder portion; the second step surface of at least one composite cutting blade group is immediately adjacent to the first step surface of a next composite cutting blade group; and the cylinder portion is longer than the cone portion.

17. The twist drill of claim 16, wherein the plurality of composite cutting blade groups comprises four or more composite cutting blade groups.

18. The twist drill of claim 16, wherein the operating portion is configured to disperse a cutting force on each of the plurality of composite cutting blade groups within a drill hole of a workpiece when at least a portion of the cylinder portion is also within the workpiece.

19. A method for improving centering accuracy of a twist drill when drilling a drill hole in a workpiece using multi-stage centering and using both a cone portion and a cylinder portion, the method comprising:
providing the twist drill comprising:
a shank portion;
an operating portion axially fixed to the shank portion, the operating portion comprising the cylinder portion and the cone portion axially fixed to the cylinder portion and a spiral flute having a sidewall and being formed into an exterior surface of the operating portion extending from a front end of the cone portion and at least partway up the cylinder portion, the shank portion axially fixed to the cylinder portion opposite the cone portion;
a plurality of four or more composite cutting blade groups formed sequentially on a cone portion exterior from the front end of the cone portion to a rear end of the cone portion, and diameters of the composite cutting blade groups sequentially increase from the front end to a rear end of the cone portion, each of the plurality of composite cutting blade groups comprising:
a first step surface;
a second step surface adjacent to the first step surface,
a major cutting edge defined by an intersection of the first step surface and the sidewall of the spiral flute;
a minor cutting edge defined by an intersection of the second step surface and the sidewall of the spiral flute; and
a cutting tip defined by an intersection of the major cutting edge, the minor cutting edge, and the sidewall of the spiral flute; and
a top blade provided on the front end of the cone portion;
wherein a plurality of said cutting tips forms a spiral pattern on the cone portion exterior; the second step surface of at least one composite cutting blade group is immediately adjacent to the first step surface of a next composite cutting blade group; the diameter of the last composite cutting blade group located at the rear end of the cone portion immediately adjacent to the cylinder portion is less than or equal to the cylinder portion diameter; and the cylinder portion is longer than the cone portion;
positioning the twist drill atop the workpiece;
applying a torque and an axial drilling force to the twist drill;

cutting the workpiece with the top blade to create a drill hole in the workpiece;
continuing cutting the workpiece using one or more of the plurality of composite cutting blade groups situated closest to the front end; and
continuing cutting the workpiece using all of the plurality of composite cutting blade groups, when a portion of the cylinder portion is also within the workpiece.

20. The method of claim 19, wherein the cone portion has an acute effective apex angle.

21. A method for improving centering accuracy of a twist drill when drilling a drill hole in a workpiece using multi-stage centering and using both a cone portion, said cone portion having an acute effective apex angle; and a cylinder portion, the method comprising:
providing the twist drill comprising:
a shank portion;
an operating portion axially fixed to the shank portion, the operating portion comprising the cylinder portion and the cone portion axially fixed to the cylinder portion and a spiral flute having a sidewall and being formed into an exterior surface of the operating portion extending from a front end of the cone portion and at least partway up the cylinder portion, the shank portion axially fixed to the cylinder portion opposite the cone portion;
a plurality of composite cutting blade groups formed sequentially on a cone portion exterior from the front end of the cone portion to a rear end of the cone portion, and diameters of the composite cutting blade groups sequentially increase from the front end to a rear end of the cone portion, each of the plurality of composite cutting blade groups comprising:
a first step surface;
a second step surface adjacent to the first step surface,
a major cutting edge defined by an intersection of the first step surface and the sidewall of the spiral flute;
a minor cutting edge defined by an intersection of the second step surface and the sidewall of the spiral flute; and
a cutting tip defined by an intersection of the major cutting edge, the minor cutting edge, and the sidewall of the spiral flute; and
a top blade provided on the front end of the cone portion;
wherein a plurality of said cutting tips forms a spiral pattern on the cone portion exterior; the second step surface of at least one composite cutting blade group is immediately adjacent to the first step surface of a next composite cutting blade group;
the diameter of the last composite cutting blade group located at the rear end of the cone portion immediately adjacent to the cylinder portion is less than or equal to the cylinder portion diameter; and the cylinder portion is longer than the cone portion;
positioning the twist drill atop the workpiece;
applying a torque and an axial drilling force to the twist drill;
cutting the workpiece with the top blade to create a drill hole in the workpiece;
continuing cutting the workpiece using one or more of the plurality of composite cutting blade groups situated closest to the front end; and
continuing cutting the workpiece using all of the plurality of composite cutting blade groups, when a portion of the cylinder portion is also within the workpiece.

22. The method of claim 21, wherein the plurality of composite cutting blade groups comprises four or more composite cutting blade groups.

23. A method for improving centering accuracy of a twist drill when drilling a drill hole in a workpiece using multi-stage centering and using both a cone portion and a cylinder portion, the method comprising:
providing the twist drill, comprising:
an operating portion comprising
the cone portion,
the cylinder portion axially fixed to the cone portion,
a shank portion axially fixed to the cylinder portion opposite the cone portion,
a spiral flute formed on an exterior surface of the operating portion extending from a front end of the cone portion and at least partway up the cylinder portion, the spiral flute having a sidewall, and
a plurality of four or more composite cutting blade groups formed sequentially on a cone portion exterior from the front end of the cone portion to a rear end of the cone portion; each of the plurality of composite cutting blade groups comprising:
a first step surface,
a second step surface adjacent to the first step surface,
a major cutting edge defined by an intersection of the first step surface and the sidewall of the spiral flute,
a minor cutting edge defined by an intersection of the second step and the sidewall of the spiral flute, and
a cutting tip defined by an intersection of the major cutting edge, the minor cutting edge, and the sidewall of the spiral flute; and
a top blade provided on the front end of the cone portion;
wherein a plurality of said cutting tips forms a spiral pattern on the cone portion exterior; and a diameter of each of the plurality of composite cutting blade groups increases sequentially from the front end of the cone portion to the rear end of the cone portion, and
wherein a diameter of a composite cutting blade group located at the rear end of the cone portion immediately adjacent to the cylinder portion is less than or equal to a diameter of the cylinder portion; the second step surface of at least one composite cutting blade group is immediately adjacent to the first step surface of a next composite cutting blade group; and the cylinder portion is longer than the cone portion;
positioning the twist drill atop the workpiece;
applying a torque and an axial drilling force to the twist drill;
cutting the workpiece with the top blade to create a drill hole in the workpiece;
continuing cutting the workpiece using one or more of the plurality of composite cutting blade groups situated closest to the front end; and
continuing cutting the workpiece using all of the plurality of composite cutting blade groups, when a portion of the cylinder portion is also within the workpiece.

24. The method of claim 23, wherein the cone portion has an acute effective apex angle.

25. A method for improving centering accuracy of a twist drill when drilling a drill hole in a workpiece using multi-stage centering and using both a cone portion and a cylinder portion, the method comprising:
   providing the twist drill, comprising:
      an operating portion comprising
         the cone portion having an acute effective apex angle,
         the cylinder portion axially fixed to the cone portion,
      a shank portion axially fixed to the cylinder portion opposite the cone portion,
      a spiral flute formed on an exterior surface of the operating portion extending from a front end of the cone portion and at least partway up the cylinder portion, the spiral flute having a sidewall, and
      a plurality of composite cutting blade groups formed sequentially on a cone portion exterior from the front end of the cone portion to a rear end of the cone portion; each of the plurality of composite cutting blade groups comprising:
         a first step surface,
         a second step surface adjacent to the first step surface,
         a major cutting edge defined by an intersection of the first step surface and the sidewall of the spiral flute,
         a minor cutting edge defined by an intersection of the second step and the sidewall of the spiral flute, and
         a cutting tip defined by an intersection of the major cutting edge, the minor cutting edge, and the sidewall of the spiral flute; and
      a top blade provided on the front end of the cone portion;
   wherein a plurality of said cutting tips forms a spiral pattern on the cone portion exterior; and a diameter of each of the plurality of composite cutting blade groups increases sequentially from the front end of the cone portion to the rear end of the cone portion, and
   wherein a diameter of a composite cutting blade group located at the rear end of the cone portion immediately adjacent to the cylinder portion is less than or equal to a diameter of the cylinder portion; the second step surface of at least one composite cutting blade group is immediately adjacent to the first step surface of a next composite cutting blade group; and the cylinder portion is longer than the cone portion;
   positioning the twist drill atop the workpiece;
   applying a torque and an axial drilling force to the twist drill;
   cutting the workpiece with the top blade to create a drill hole in the workpiece;
   continuing cutting the workpiece using one or more of the plurality of composite cutting blade groups situated closest to the front end; and
   continuing cutting the workpiece using all of the plurality of composite cutting blade groups, when a portion of the cylinder portion is also within the workpiece.

26. The method of claim 25, wherein the plurality of composite cutting blade groups comprises four or more composite cutting blade groups.

\* \* \* \* \*